J. TORRENT.
Log Turner.
No. 9,291. Reissued July 13, 1880.
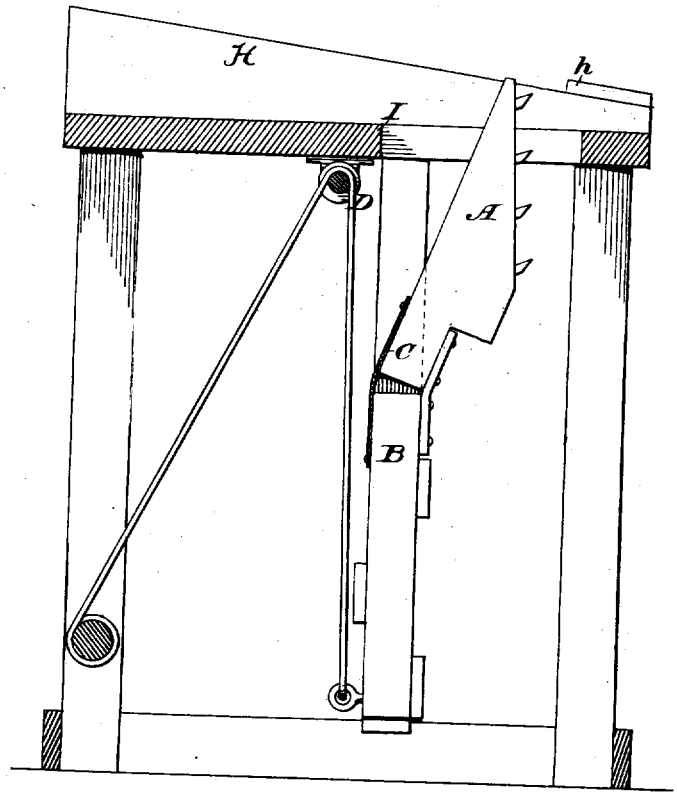
Attest:
Frank Thomason
Lew. Sulz
Inventor:
John Torrent,
by Ellis Spear
Attorney.
N. PETERS, PHOTO-LITHOGRAPHER, WASHINGTON, D. C.

UNITED STATES PATENT OFFICE.

JOHN TORRENT, OF MUSKEGON, MICHIGAN.

LOG-TURNER.

SPECIFICATION forming part of Reissued Letters Patent No. 9,291, dated July 13, 1880.

Original No. 141,739, dated August 12, 1873. Application for reissue filed April 5, 1880.

*To all whom it may concern:*

Be it known that I, JOHN TORRENT, of Muskegon, county of Muskegon, and State of Michigan, have invented certain Improvements in Log-Turners. The following description, taken in connection with the accompanying drawing, forms a full and exact specification thereof.

My invention relates to that class of appliances which are made use of in saw-mills for the purpose of moving, rolling, or turning logs; and it consists in certain improvements in the form and construction of the same, hereinafter specified.

The accompanying drawing gives a side view of the device, partly in section.

The apparatus shown in the drawing is designed to force the logs one by one from supporting-ways on which they rest to the carriage of the saw-mill.

The ways on which the logs are supported in readiness thus to be transferred to the carriage are represented at H. They are represented as slightly inclined in the direction in which the logs are to be moved, in order that the said logs may move forward toward the stop *h*. This stop *h* is arranged across the inclined ways at their lower ends. The stop is low and of such size and shape that while sufficient to detain the logs it may yet permit them without difficulty to be forced over itself and away from the inclined ways.

The immediate device for moving the logs is shown at A. This is a hinged or pivoted bar or head, in shape and position adapted to be forced upward between the forward log and the one immediately in rear of the forward log. This bar or head is hinged or pivoted at its lower end to an upright shaft, B. Its backward movement upon its pivot is limited, as will appear, by an abutment, I, so that when it reaches that backward limit its straight side will be in line with the side of the shaft B. It is shown inclined forward toward the stop.

The shaft B is adapted to move vertically in guides or ways. A chain is attached to the said shaft, carried up over a sheave, D, and thence to any suitable mechanism, to which power may be applied to draw upon the chain and elevate the shaft.

The head A is represented as tapering or wedge-shaped, and when lowered its hinged or pivotal connection with the shaft B permits it to adjust itself in proper position to take hold of the log, and when forced upward to partially turn and press this log forward over the step *h*, in order that it may pass to the carriage.

The inclined forward face of the head or bar H is represented in the drawing as provided with teeth, which more effectually take hold of the log in order to roll it to the carriage. After one log has been forced over the stop *h* the head may be lowered and again adjusted to the next log to be moved, the stop being in such position that it holds the logs in proper position to be acted upon by the bar as it rises.

Having thus described my invention, what I claim is—

1. An apparatus for moving logs to the carriage of a saw-mill, consisting of ways provided with a stop over which the logs may be rolled, and of a wedge-shaped head or bar provided with mechanism whereby it may be raised or lowered and fitted to operate in relation to the ways and stop, substantially as described.

2. The combination, in an apparatus for moving logs to the carriage of a saw-mill, of the inclined ways H, stop *h*, pivoted wedge-shaped head A, shaft B, provided with guides or ways, and elevating and lowering mechanism, substantially as described.

3. In combination, the ways H, stop *h*, and the toothed wedge-shaped head A, pivoted to an elevating device, substantially as shown and described.

In testimony that I claim the foregoing I have hereunto set my hand this 29th day of March, A. D. 1880.

JOHN TORRENT.

Witnesses:

DAVID D. ERWIN,

FRANCIS SMITH.